(12) United States Patent
Lachance

(10) Patent No.: US 8,505,929 B2
(45) Date of Patent: Aug. 13, 2013

(54) RETRACTABLE AND AUTOMATIC POSITIONING WHEELS FOR SNOWMOBILES

(76) Inventor: Ghislain Lachance, St-Elzear (CA)

( * ) Notice: Subject to any disclaimer, the term of this patent is extended or adjusted under 35 U.S.C. 154(b) by 47 days.

(21) Appl. No.: 13/374,070

(22) Filed: Dec. 9, 2011

(65) Prior Publication Data
US 2012/0181758 A1 Jul. 19, 2012

(51) Int. Cl.
*B62B 13/18* (2006.01)

(52) U.S. Cl.
USPC .................................................. 280/9; 280/10

(58) Field of Classification Search
USPC ............... 280/9, 11, 28, 809, 7.1, 8, 10, 28.4; 180/182
See application file for complete search history.

(56) References Cited

U.S. PATENT DOCUMENTS
8,191,905 B2 * 6/2012 Beaudoin .......................... 280/9

* cited by examiner

*Primary Examiner* — John Walters
*Assistant Examiner* — James Triggs

(57) ABSTRACT

A device allowing positioning of wheels of a snowmobile when skis leave a snowy path to continue on a road. The device comprises at least two parallel wheels positioned near each ski, a pair of cylinders placed in connection with each wheel, and controlled by a control box by a driver activating pistons to move the wheels from an upward position to a downward ground position. The upward position corresponds to wheels elevated over the ski when the piston is contracted; and the downward position corresponds to wheels in touch with the ground when the piston is extended. Means of clutch move horizontally the wheels to an external position. A spike located on an arm which supports a wheel is positioned to scratch ground ice for creating a mist when a wheel is in a scratching position.

19 Claims, 13 Drawing Sheets

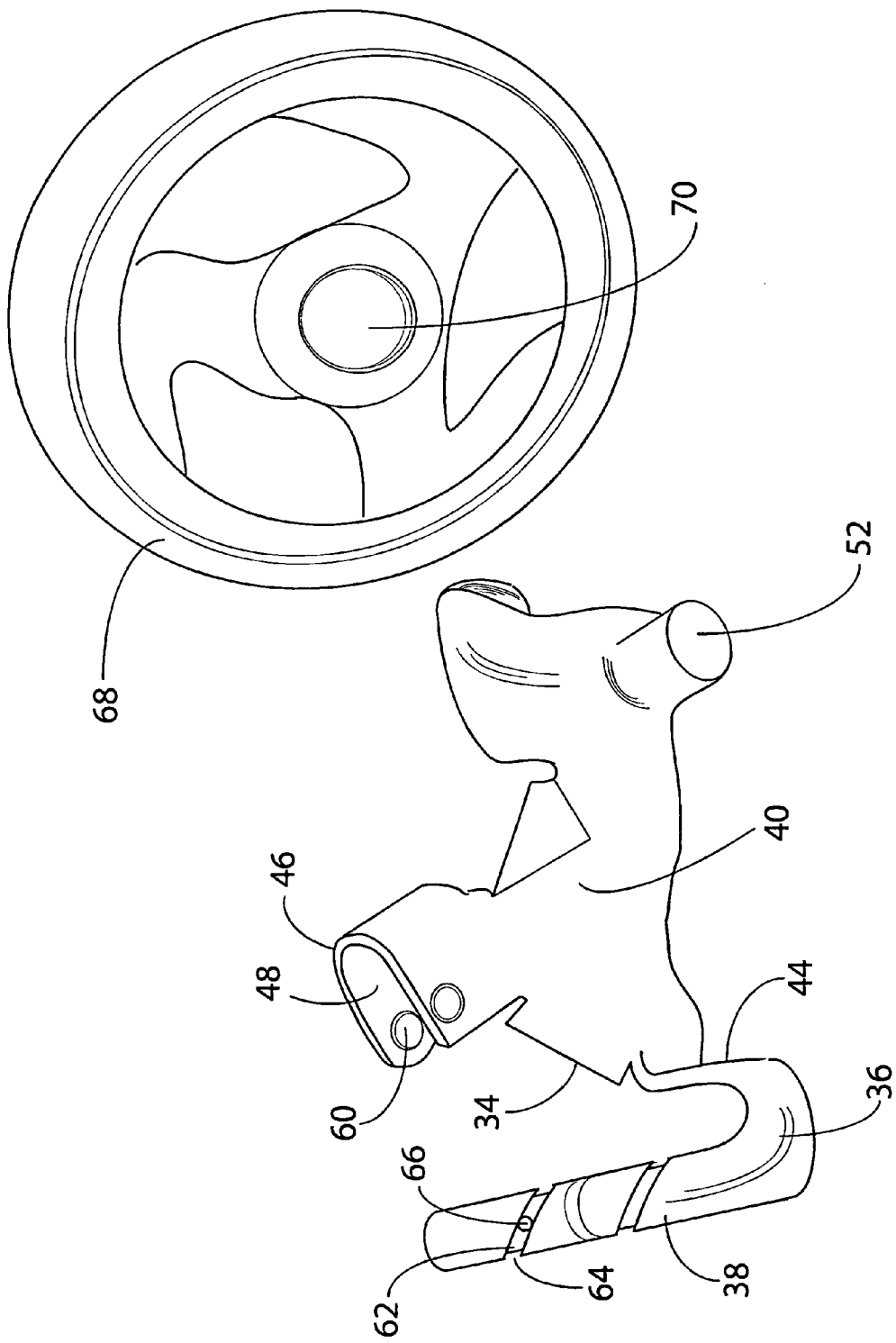

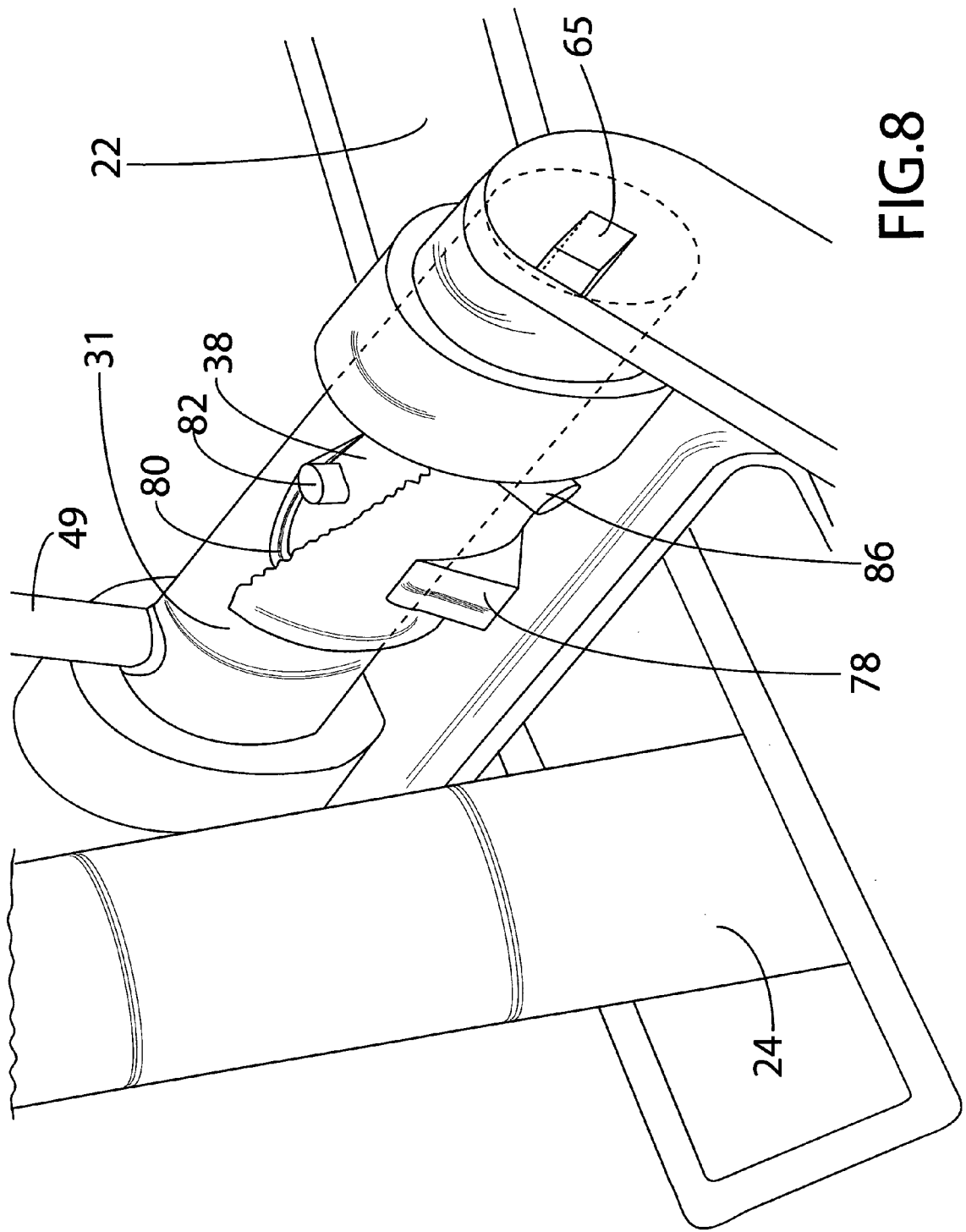

RETRACTABLE AND AUTOMATIC POSITIONING WHEELS FOR SNOWMOBILES

BACKGROUND OF THE INVENTION

The present invention relates to a device for wheels for snowmobile ski allowing immediate positioning of the wheels on the ground while the snowmobile is on movement. No need to stop the snowmobile for positioning the wheels.

PRIOR ART

The present invention refers to a canadian patent application CA 2,724,925 <<RETRACTABLE AND AUTOMATIC POSITIONING WHEELS FOR SNOWMOBILES>> filed on Dec. 10, 2010 by the same author.

The following applications drew our attention:

CA 2647375 "Retractable snowmobile wheel" by Denis Beaudoin published on Jun. 8, 2010, shows a retractable wheel for a snowmobile in an extension position for driving on the ground, and in a contraction position for sliding on ice. The contraction position is automatically done by means of spring when the snowmobile slide on snow.

CA 2687708 "Retractable wheel system . . . " by Denis Beaudoin published on Jun. 8, 2010, shows a prealably tensed spring which repositions wheels of a snowmobile in a contracted position when the snowmobile get on the snow.

U.S. Pat. No. 5,439,237 "Retractable wheel system . . . " by Steven A. Kutchie, published on Apr. 13, 1994 shows a pivoting assembly of wheels to raise a snowmobile from the ground.

OBJECTIVES AND ADVANTAGES

There is a need in the market of snowmobiles for a retractable wheels device allowing the wheels to be automatically positioned on the ground when the snowmobile is arriving on the ground. And when the snowmobile returns on the snow, the device hides the wheels over the ski so that the wheels are no longer in contact with the snow, thereby avoiding a collision of the wheels with the snow which would risk changing the trajectory of the snowmobile.

The device includes:
- At least two parallel wheels, each wheel being arranged on each ski of the snowmobile, and with the space between wheels slightly bigger than the space between skis;
- A wheel motor installed in connection with each wheel and controlled by a control box by the driver;
- A cylinder activated by each motor and intended to move a piston between a rest position, when the piston is contracted, and an active position, when the piston is advanced;
- A positioning triangle to move wheels vertically from a rest position corresponding to wheels elevated over the ski to an active position with wheels in touch with the ground;
- Means of clutch to horizontally move the positioning triangle from a closed position when wheels are hidden to an external position when wheels supporting the snowmobile drive on the ground.

The present invention will be further understood from the following description with reference to the drawings.

BRIEF DESCRIPTION OF DRAWING FIGURES

FIG. 2 is a perspective of the triangle with its "road with ball"

FIG. 3 is a view of a wheel to be installed on the triangle.

FIG. 8 is an image of the displacement bushing on the ski.

DETAILED DESCRIPTION OF THE PREFERRED EMBODIMENTS

In the following description and in the accompanying drawings, the numeral numbers refer to identical parts in the various Figures.

Figure 1:
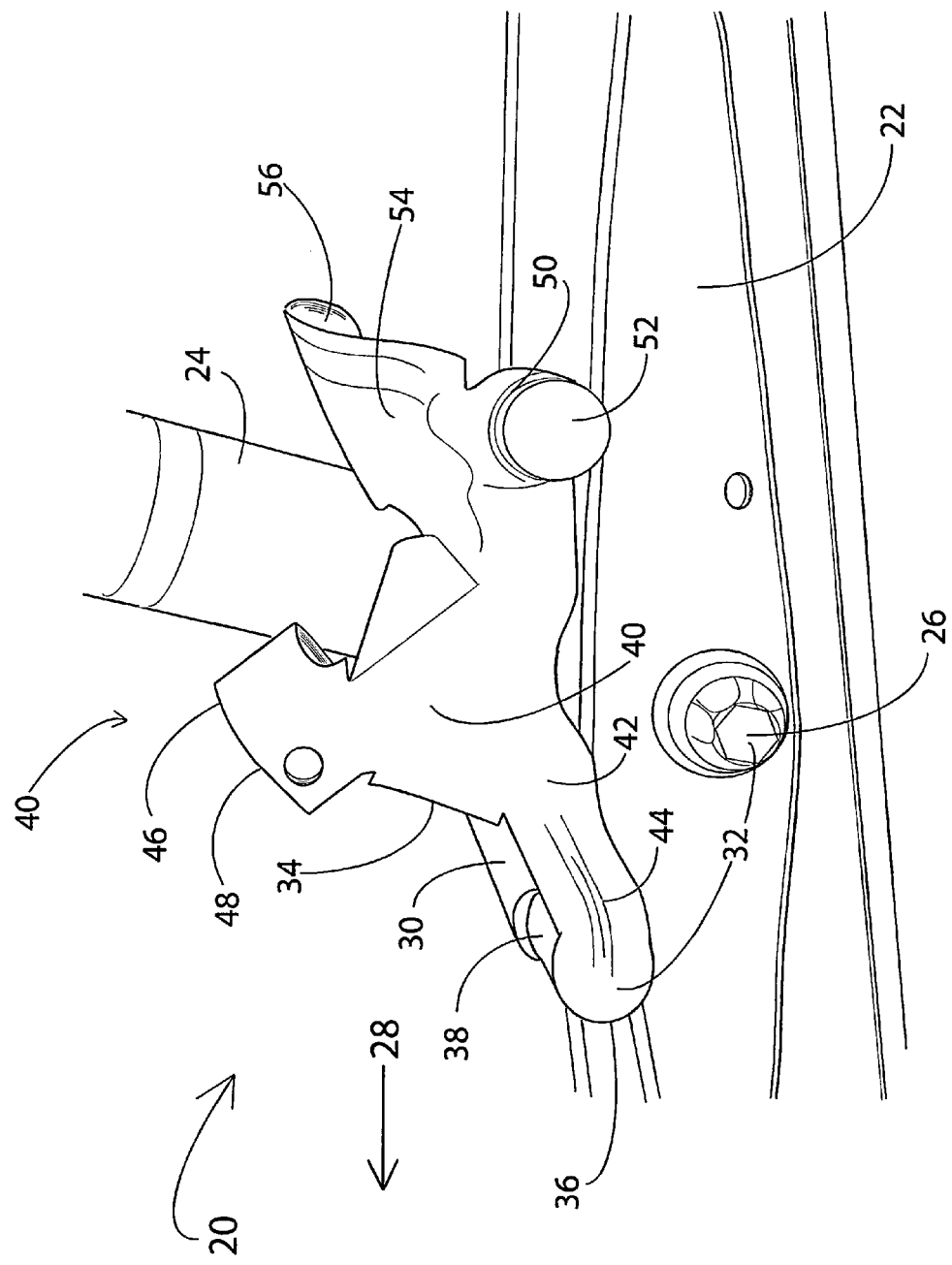
FIG. 1 is a perspective of a positioning triangle on a ski.

FIG. 1 shows a ski 22 of a snowmobile 20 with a supporting stalk 24 fixed to the ski at pivot 26, and the stalk is leaning towards the direction of movement 28 of the snowmobile. A female part in a shape of a sliding tube 30 is perpendicularly fixed to the ski and is welded over the ski and in front of the supporting stalk at a distance 32 from the pivot 26. A seesaw 34, located over the ski and near the supporting stalk 24, and having a near extremity 36 having a male extension 38 which fits into the sliding tube 30 and intended to slide inside so that the seesaw 34 will be at one time close to the supporting stalk 24 and at another time horizontally moved outside the ski 22. The seesaw 34 comprises a triangular body 40 having a side end 42 connected to the near extremity 36 by a bent junction 44. A top end 46 of the triangular body includes a tip 48 adapted to receive the end of a piston. The triangle comprises a third end, remote, 50 to which a hub 52 is fixed and intended to hold a wheel. The remote end 50 is positioned beyond the pivot 26 and has an effect of push against a back part of the ski by oscillating in tandem with the near extremity 36 lead by the seesaw 34. The remote end 50 supports a curved structure 54 which has a free extremity which is a crowbar 56 serving as means of tie of the triangle to the ski when the triangle is moving towards the outside of the ski and revolving under a push of the piston and making the hub fall to allow the wheel to touch the ground.

FIG. 2 shows the triangular body 40 with its top end 46 and the seesaw 34 connected with the near extremity 36 by the bent junction 44. The near extremity 36 is extended by the male part 38 connected perpendicularly to the plane of the triangular body 40. The male part includes a spiralled channel 62 inside which a ball 66 is shown. The spiralled channel is twisted 64. One sees the hub 52 with openings for tightening 60 in the tip 48.

FIG. 3 shows a wheel 68 with a hole 70 in its center.

Figure 4:
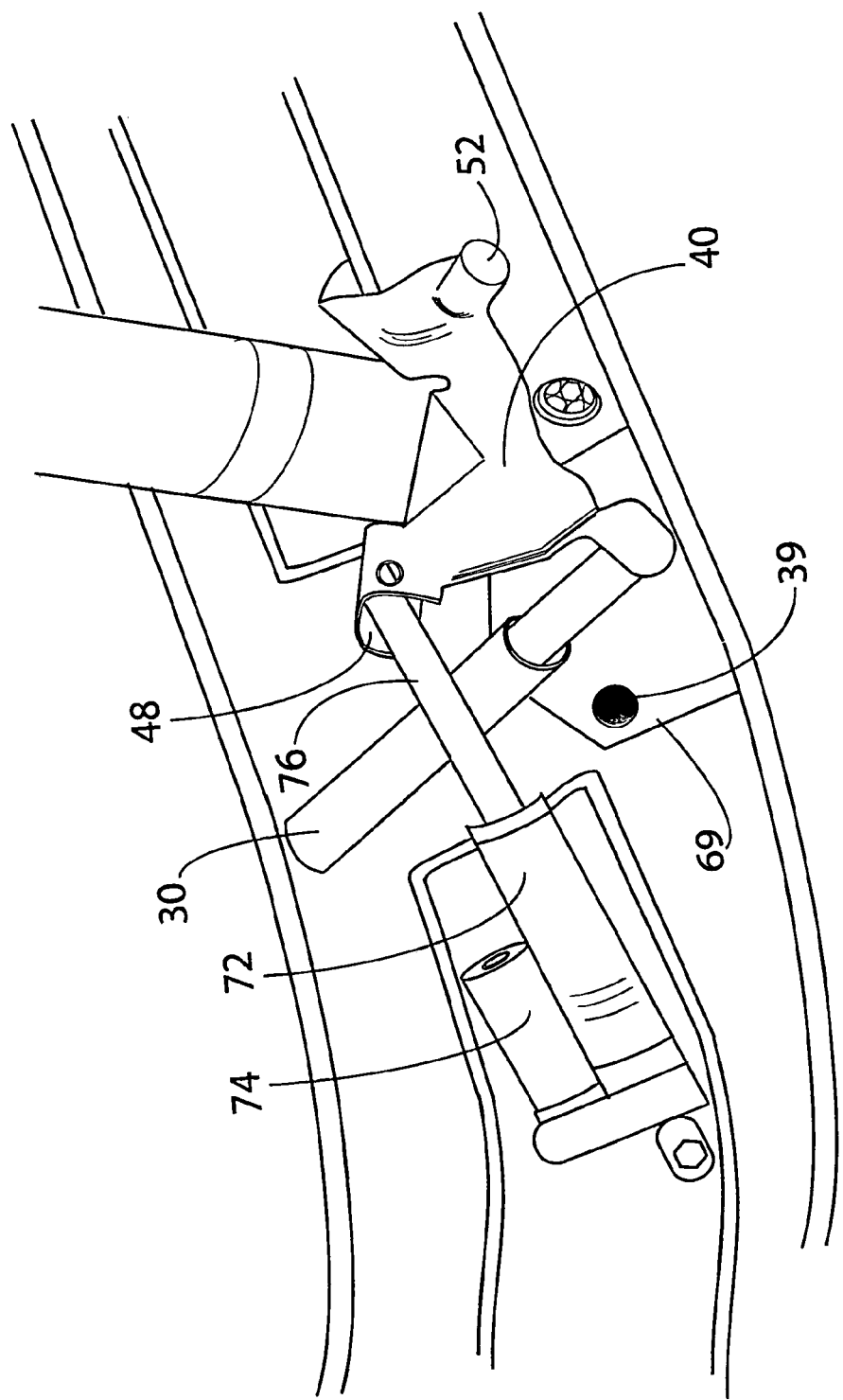
FIG. 4 is a perspective of the triangle activated by a piston.

FIG. 4 shows a cylinder 72 with an electric motor 74 and prolonged by a piston 76 inserted in the tip 48 of the triangular body 40; the piston is shown passing over the sliding tube 30. The sliding tube 30 is fixed to a plate 69 of steel and welded on the ski at the weld point 39. The hub 52 is shown.

Figure 5:
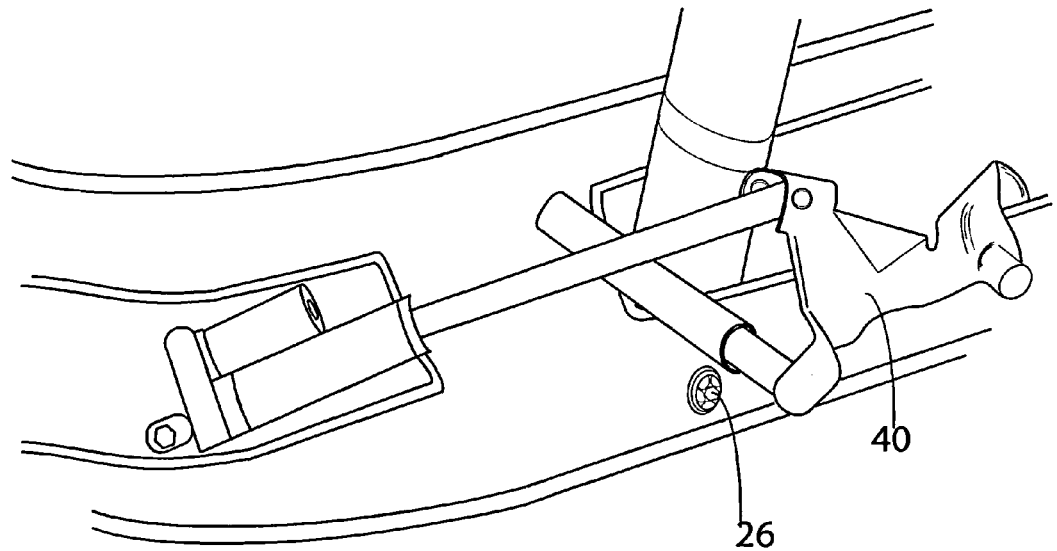
FIG. 5 is a view of the triangle at the back of a central pivot of the ski.
Figure 6:
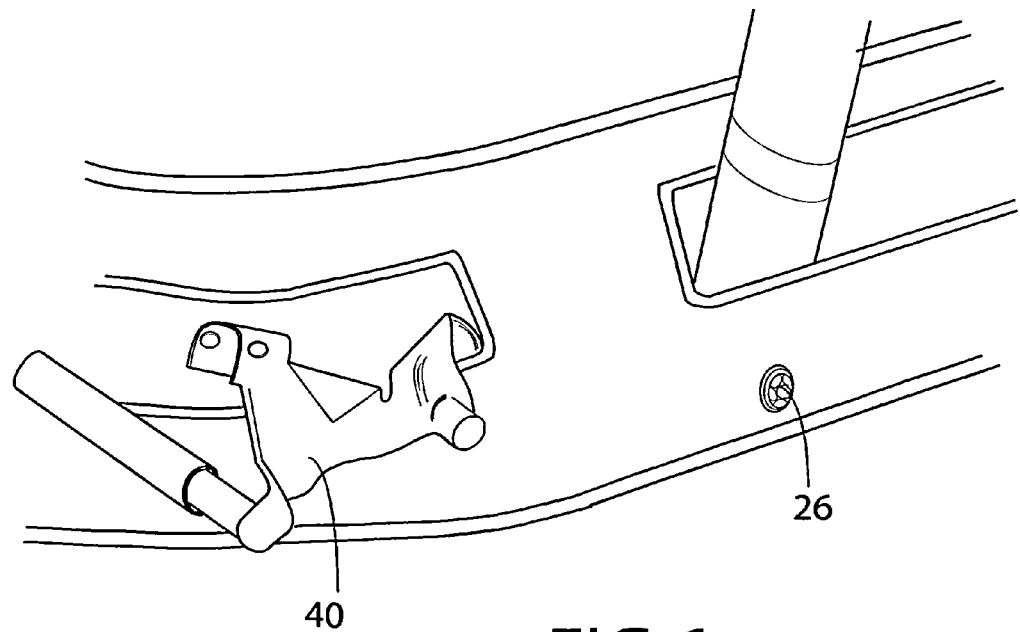
FIG. 6 is a view of the triangle in front of the central pivot of the ski.

FIGS. 5 and 6 show the triangular body 40 installed in two different positions; in FIG. 5 the triangle is entirely placed behind pivot 26. In FIG. 6 the triangle is placed in front of pivot 26.

Figure 7:
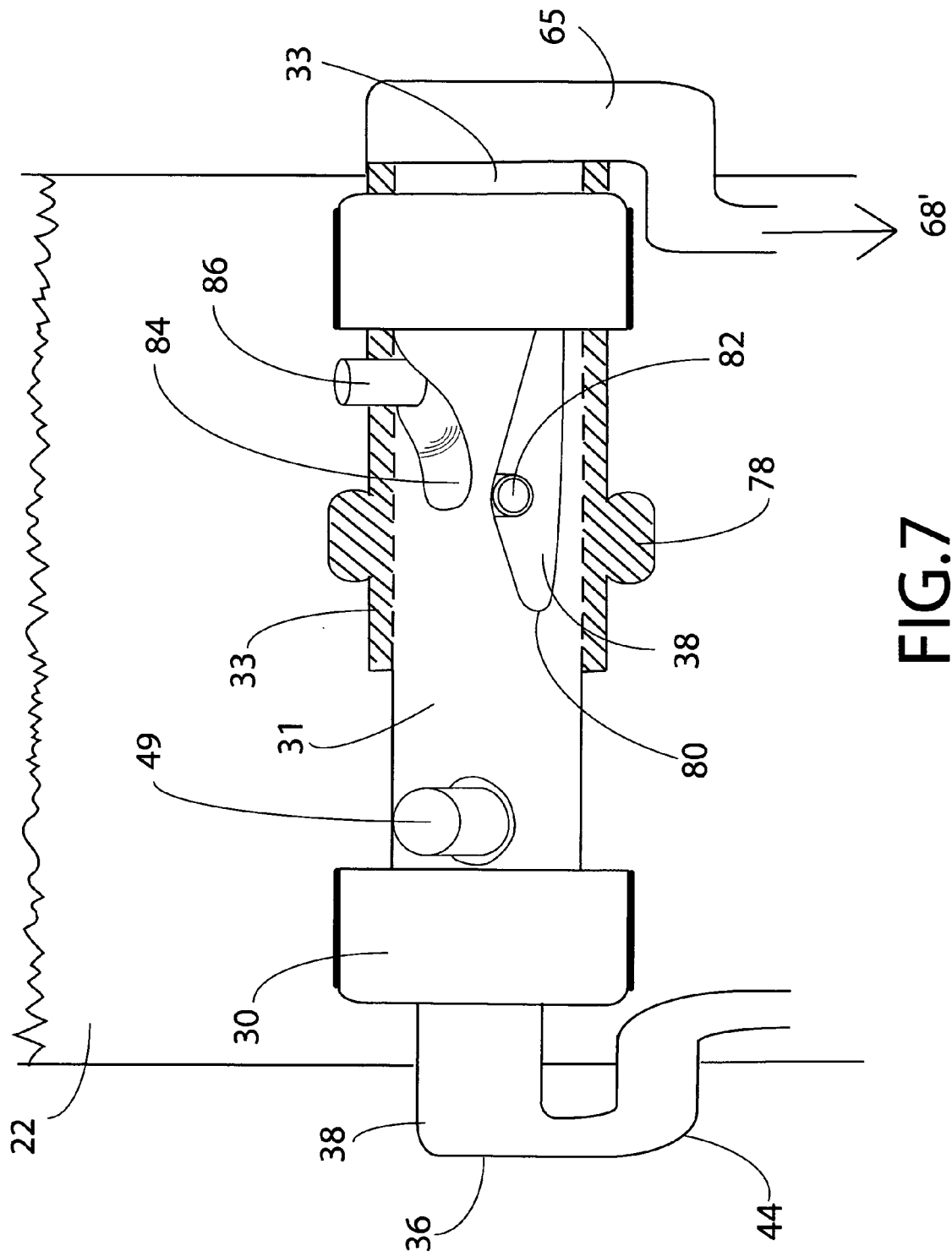
FIG. 7 is a view of a system of displacement bushing.

FIG. 7 shows a system of concentric bushings comprising a first bushing 31 comprising an arm 49 intended to be moved. The first bushing surrounds the male part 38 and comprises a first keyway 80 intended to receive a first ankle 82 perpendicularly installed on the male part 38. The first bushing includes a second keyway 84 intended to receive a second ankle 86. One sees a second concentric bushing 33 surrounding the first bushing 31 and including the second ankle inwardly jutting out of the second bushing 33 and intended to ride the second keyway to impart an ark of rise and lower an axle 65 of an internal wheel 68' to the ski 22. In the sliding tubes 30 welded to the ski at a periphery are inserted the system of concentric bushings. An abutment 78 limits the rotation of the second bushing 33. One sees the near extremity 36 and the curved junction 44.

FIG. 8 shows a perspective of the displacement bushing on the ski 22 close to the supporting stalk 24. One sees the arm 49 on the first bushing 31, the abutment 78, the axle 65 of an additional wheel inside the ski, and the first 82 and second 86 ankles defining the course of rotation of the male part 38 and the axle 65 respectively. A first keyway 80 is shown.

Figure 9A:
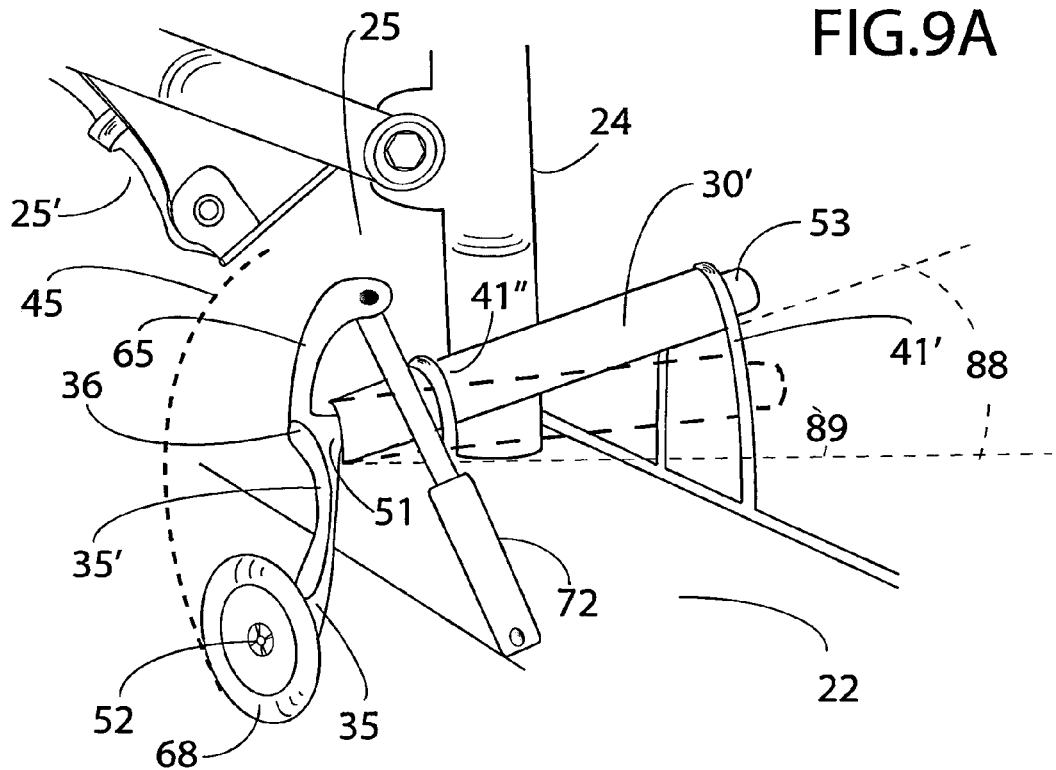
FIG. 9A is a perspective of the device with an oblique support of wheels.

FIG. 9A shows the supporting stalk 24 of the snowmobile at the top of which a small dome 25 is shown and at the foot of which a pivot of the ski is shown. Near the stalk is an oblique tube of sliding 30' positioned at an angle 88 and maintained by means of tie, a near tie 41" and a remote tie 41' of the ski 22. At the near extremity 36 of the sliding tube is a central axis of an interior stalk 53 with a circumference 51 intended to be subjected to a piston; this action can be applied in a remote plane of circumference. The near extremity of the interior stalk 53 allows to hold a twisted arm 35 which has an added twist 35'.

Figure 9B:
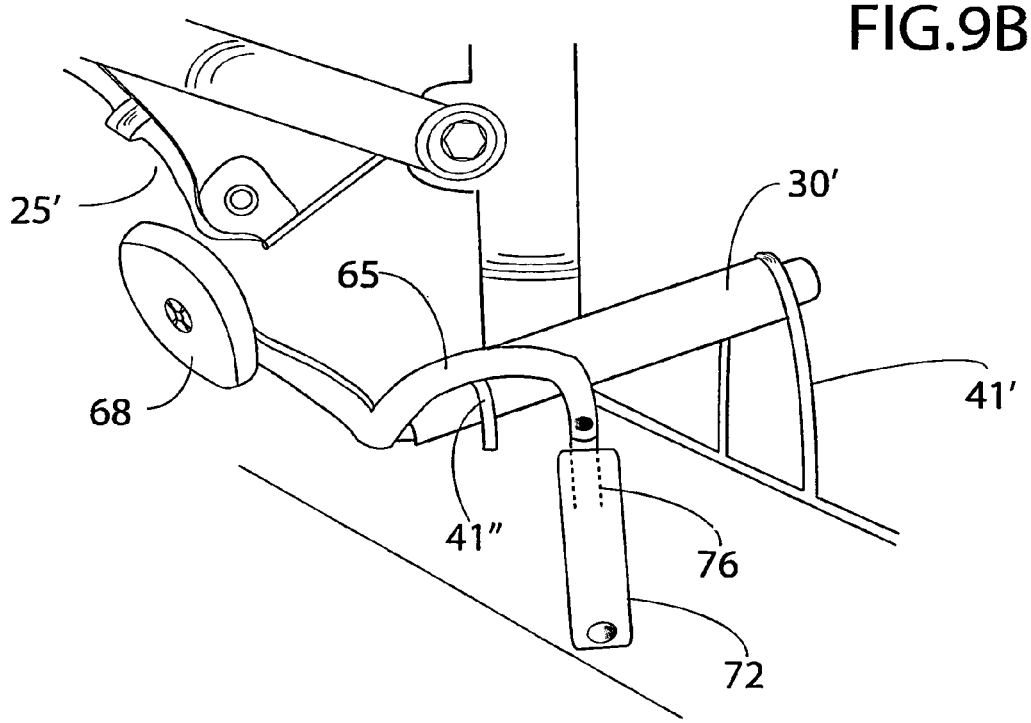
FIG. 9B is a perspective of the oblique support with an elevated wheel.

At the end of the twisted arm is the hub 52 of the wheel 68 which is currently on the ground, but which can make a trajectory 45 as far as the small dome 25 near the supporting stalk 24 when the oblique sliding tube will be oriented at a smaller angle 89. The wheel can also make a trajectory as far as a bigger dome 25' and be in a position such as seen in FIG. 9B. One sees the cylinder 72 and the arm of axle 65.

FIG. 9B shows the oblique tube 30' as in FIG. 9A supporting the wheel 68 almost at the end of its trajectory near the bigger dome 25'. The piston 76, the cylinder 72, the arm of axle 65 and the ties 41', 41" are shown.

Figure 9C:
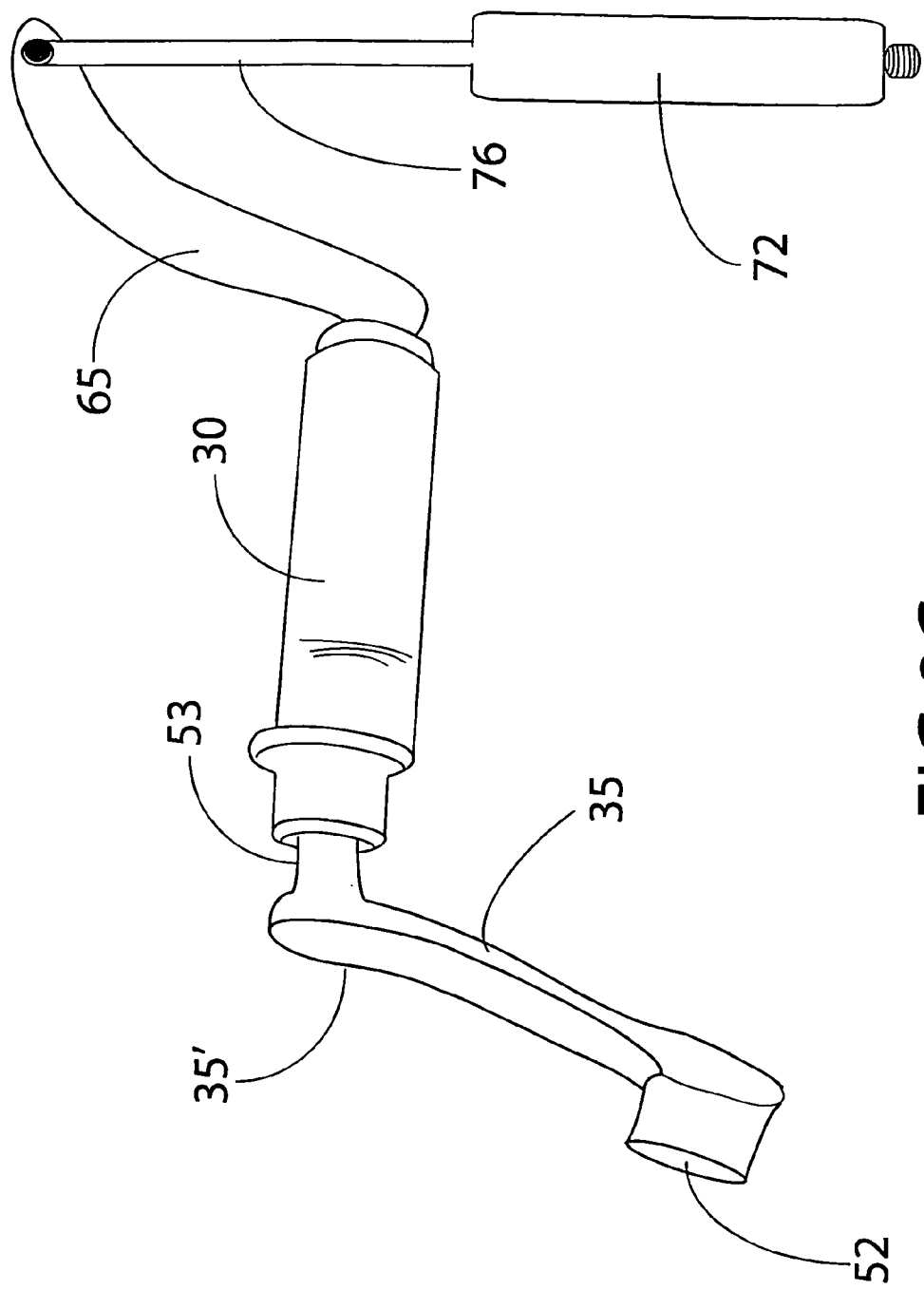
FIG. 9C is a perspective of means of tube and torsioned arm.

FIG. 9C shows the sliding tube 30 and the twisted arm 35 comprising a twist 35' intended to minimize the spread of the wheel when risen. One sees the arm of axle 65 in a second plane and the beginning of the internal stalk 53, fitting into the tube. One sees the hub 52, the piston 76 and the cylinder 72.

Figure 10A:
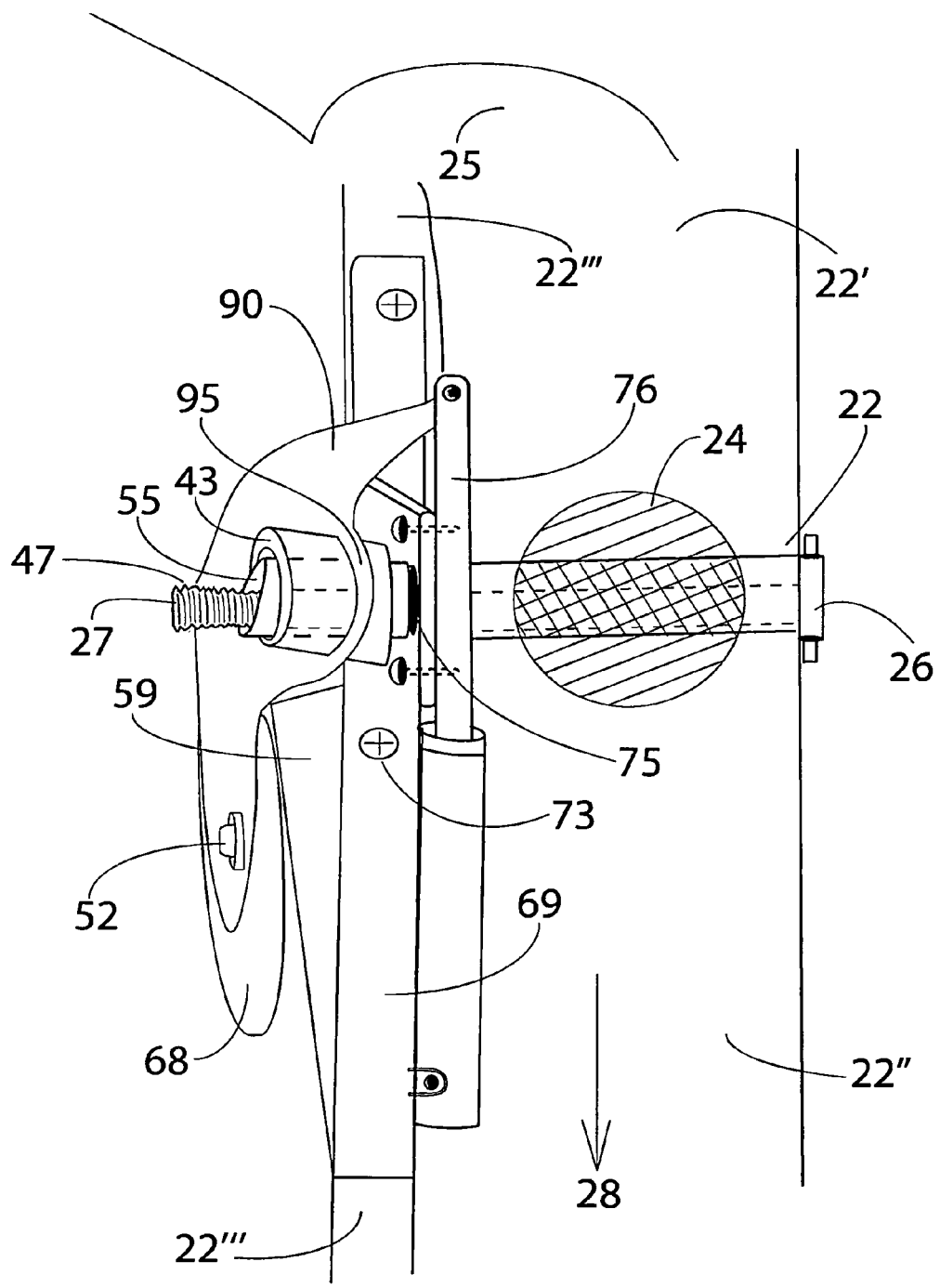
FIG. 10A is a face view of the device with a wheel on the ground.

FIG. 10A shows a perspective of the ski 22 with its back 22' and its front part 22", the ski moving in the direction 28. The supporting stalk 24 is shown in a cut section. One sees the piston 76 leaning against a plate of transation 90 of the wheel 68. The plate surrounds a bushing 43. The bushing 43 is approximately 15° oriented and is surrounding a threaded 47 extension 27 which prolongs in a transverse bolt, already existing, as far as the supporting stalk 24 and the central pivot 26 of the ski.

The bushing 43 is welded to the plate 90 which holds the wheel 68 by its hub 52. When the plate turns, it is moving away from the wheel 68 up to the dome 25. Inside the bushing 43 there is an axle 55 which has a recess coinciding with a same recess 75 on a steel plate 69 which is fixed by bolts 73 to sides 22''' of the ski 22. The axle 55 is eccentric with regard to the extension 27 which allows during the rotation of the bushing 43 and the wheel 68 a close positioning over the ski, and left and right movements of the wheel towards dome 25. The plate 69 has a perpendicular deflector 59.

Figure 10B:
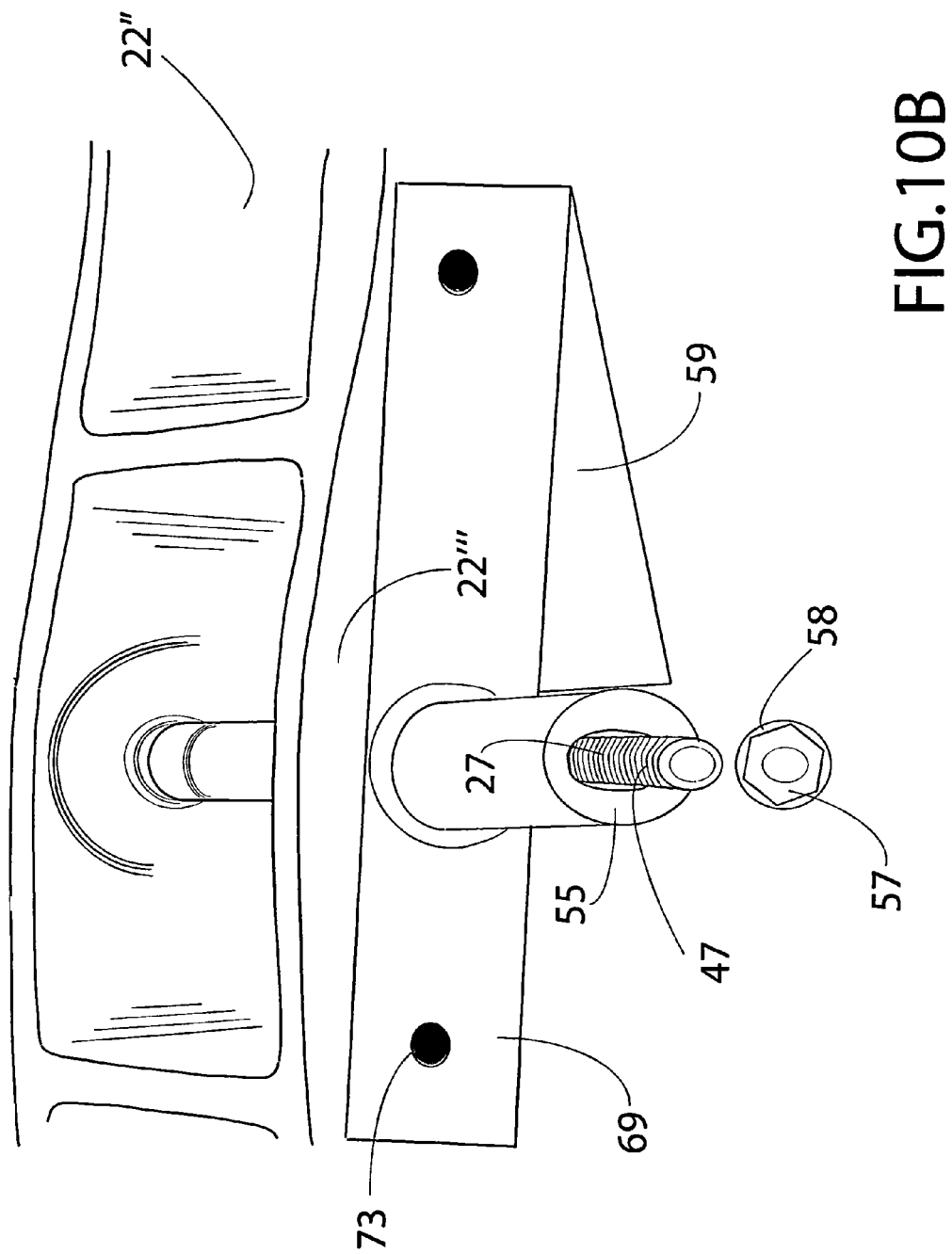
FIG. 10B is a face view of a support plate.

FIG. 10B shows the front 22" and the sides 22''' of the ski having a bolted 73 plate 69 possessing the perpendicular deflector 59 which protects the passage of the wheel against rocks or obstacles. Threads 47 of the extension 27 hold a nut 57 of six (6) faces and a washer 58. The axle 55 surrounding the extension 27 is shown.

Figure 11A:
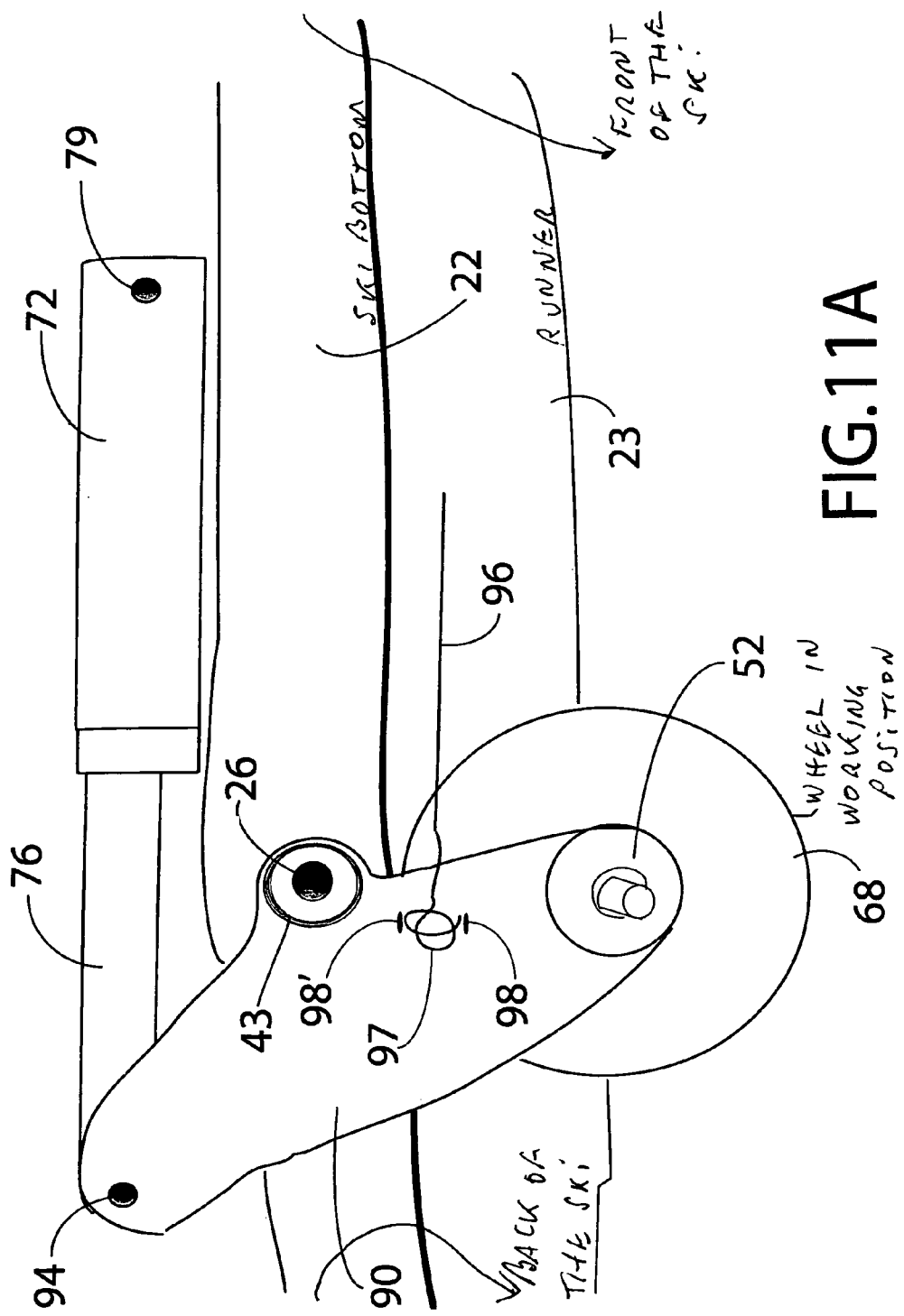
FIG. 11A is a face view of an alternative device, on the ground.

FIG. 11A shows the ski 22 wherein piston 76 and its cylinder 72 are attached to the ski in a pivot of cylinder 79. At the end of the piston the plate 90 is attached at a pivot of piston 94 and is also attached to the ski at a fixed point corresponding to the central pivot 26. The plate is used to support the wheel 68 which is attached on it by the hub 52. The plate and the wheel are shown in a vertical position. One sees attached to the plate a spike 96 used to scratch the ice, as well as its spring 97 maintained in a section located between each stopper 98 and 98'. When the spike and the spring are oriented horizontally and in the space of the ski or of its runner 23, then they have no effect on the ice.

Figure 11B:
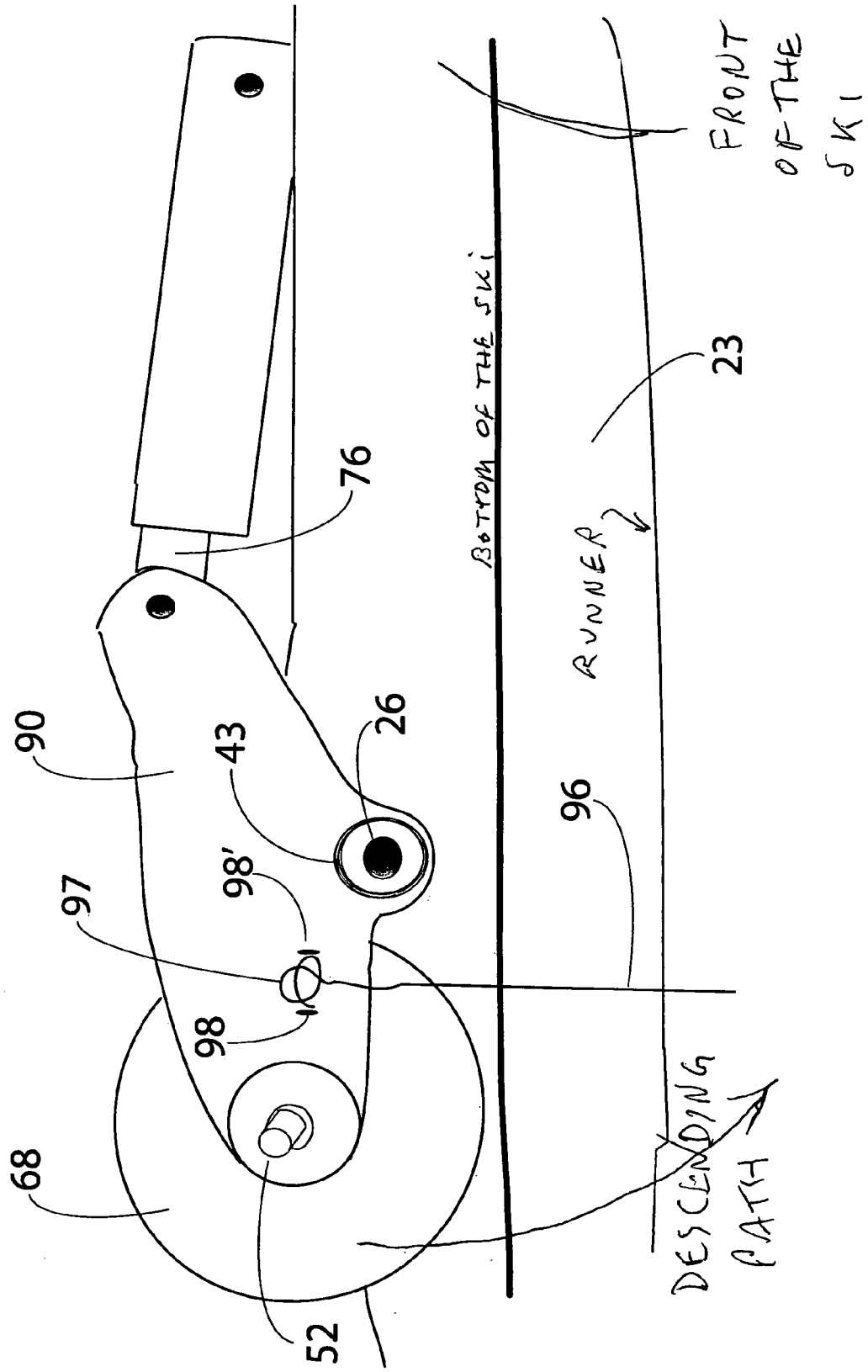
FIG. 11B is a face view with a wheel in a horizontal position.

FIG. 11B shows the plate 90 and the wheel 68 positioned horizontally with the contracted piston 76; the spike 96 according to its length could exceed the depth of the runner 23; in that case the spring 97 would limit the effect of the spike. One sees the hub 52 and the stoppers 98, 98' of the spring. One sees that the cylinder is supported by the front skis and the wheel goes down from the back of the central pivot 26.

Figure 11C:
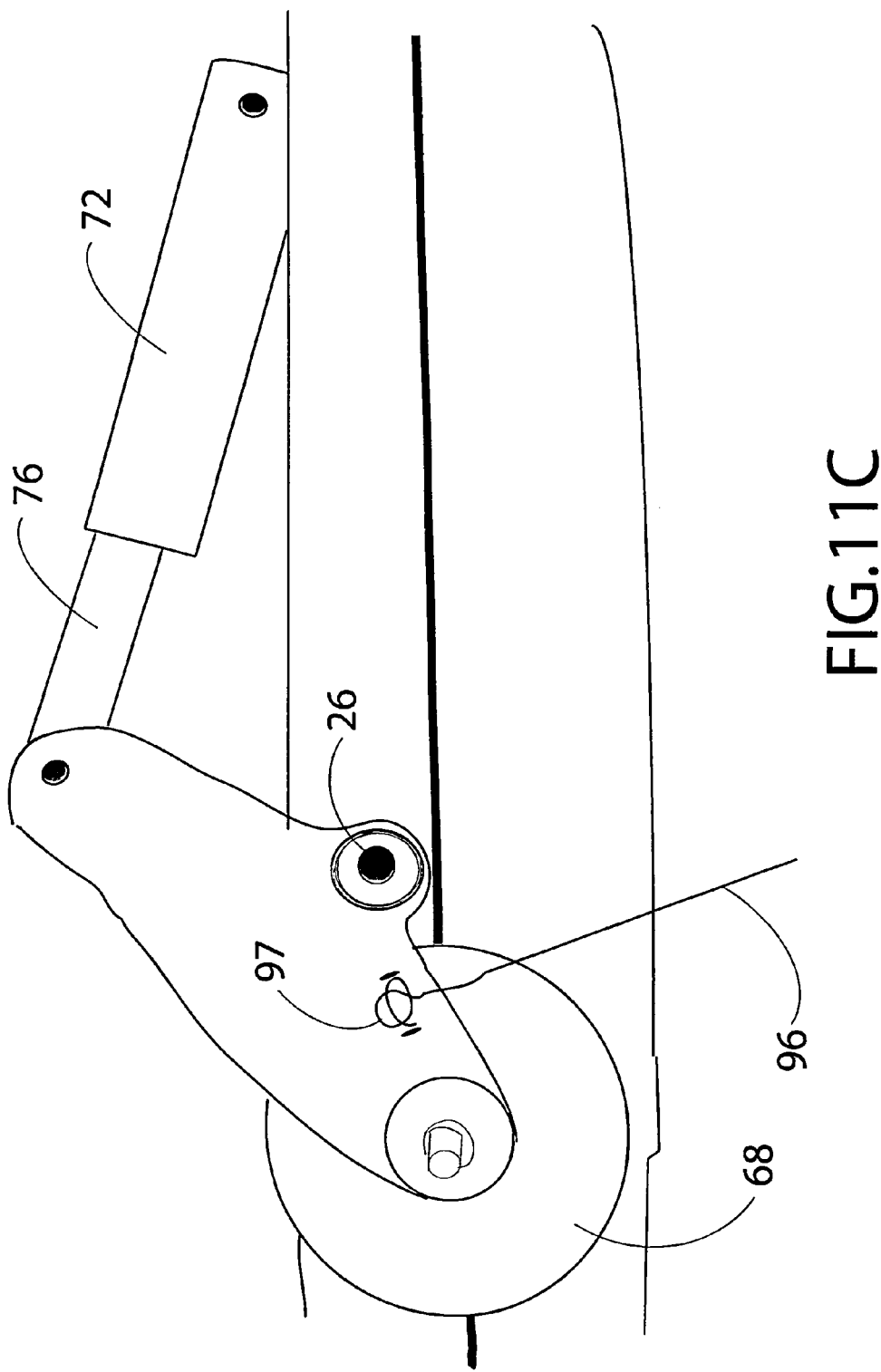
FIG. 11C is a face view with a wheel in an oblique position.

FIG. 11C shows the plate and the wheel 68 making an angular movement downward from the central pivot 26 of the ski. The cylinder 72 and the piston 76 maintain the plate in its position. The spike 96 and the spring 97 are in a lower position, oblique, directed towards the front, and continue to scratch the ice. It is important that the wheel go down from the back towards the front for preventing the wheel to be removed away from the ski when touching the ground if there is too much friction. The descent of the wheels from the back to the front renders the wheel capable to touch the ground and to raise the snowmobile gradually while the snowmobile is running, without risk of accident.

SUMMARY (FIGS. 9C,10A,11A) A device of retractable wheels for a snowmobile 20 having a pair of skis 22,22', each ski comprising rotation means transversally disposed about an axis (27, 55) of said ski, a rectractable wheel device disposed to effect contact with the ground when on an internal side of either ski. The device comprises a triangular body 90 (FIG. 11A) installed in a first plane which comprises three extremities among which:
  a first near extremity comprising a rotating part 43 (FIG. 10A) comprising means of rotation disposed perpendicularly 51 (FIG. 9A), 38 (FIGS. 1&7) of the first plane, the means of rotation comprising a rotative male-female part 43 moving around a male-female center axle 55;
  a remote end 50 comprising a hub 52 substantially perpendicular to the plane of the triangular body and intended to receive a wheel 68;
The hub being connected with the male part by a twisted arm 35 comprising means of positioning in rotation intended to vary the position of the wheel between a position against the ground and a hidden position behind a high structure of the ski;

the third extremity of the triangular body comprising means to apply a rocking movement with regard to the first extremity thus making it revolve.

The third extremity being radially located with regard to a pivot center 55, thereby allowing the displacement of a circumferential push from 0 to 120°.

The movement is intended to raise and to lower the hub 52 between the position against the ground and the hidden position;

the first extremity is a pivot center of the male part 38, and the third extremity is circumferentially located with regard to the pivot center, allowing the displacement of a circumferential push from 0 to 90°;

the third extremity is remotely located 51' at a distance from to the first plane, thus creating a second plane parallel to the first plane;

the means of rotation can be a tube (30,30') including a closer strip 41' and a remote strip 41" comprising means to allow the rotation of the male part 38. The closer 41' and remote 41" strips are continuous and form a female tie forming the tube 30 as means of rotation and intended to contain the male part 38. The remote strip 41" is vertically oriented at 1° to 45° with regard to the closer strip.

The twisted arm comprises a curve which positions the hub at an angle corresponding to an orientation of the male part. The positioning angle 88 comprised between 1 and 45°. It also comprises a twisting 35' intended to minimize the spreading with regard to a high structure of the ski.

The means of tube can be a sliding tube 30 used in connection with means permitting to enter and exit the male part. Such means are in the shape of a spiralled channel 62 which allows to move horizontally and positively in the sliding tube with the aim to push away the triangular body towards the outside of the ski and so allow the wheel to touch the ground under the influence of the rocking movement produced by the pushing away of the triangular body.

The top end 46 is a tip 48 which under the effect of a piston 76 positioned above the ski produces a rocking movement 34 with regard to the near extremity and intended to raise and to lower the hub. The piston is activated by an electric motor 74 controlled by a control box by the driver.

The spiralled channel 62 is located around the male part and a ball 66 is partially inserted into the sliding tube and partially into the spiralled channel so that with the rocking movement, at the same time the male part pivots and moves forward and back when the spiralled channel is moving around the ball.

The retractable and automatic wheel device is placed on a ski preferentially at the level of the supporting stalk 24 but it can be also placed in front or behind the supporting stalk.

The supporting stalk comprises a central pivot 26 and the means of rotation 43 are thereby located near the supporting stalk, from 0 to four inches towards the rear and oriented between the two skis. The central pivot comprises an extension 27 holding the axle 55 surrounded by a rotation bushing 43 attached to a plate of translation 90. The axle 55 is eccentric with respect to the extension 27 (FIG. 10A).

The rotative bushing 43 is rotating around the axle 55 which is oriented from 0 to 25° from the central pivot 26 and intended to position the wheel in high position above the ski and displaced according to a left-right orientation of the wheel.

The plate of translation 90 comprises a deflector 95 and a spike 96 perpendicularly disposed and intended to scratch snow and ice to throw a mist of snow to cool a part of the snowmobile, the spike comprising means of spring 97 intended to limit between a first and a second stoppers (98, 98') and to return the movement of the spike.

The spring is positioned around one of a group of elements comprising the hub 52, the central pivot 26 and being removable and being tidied up.

The extension 27 is surrounded by the axle 55 angularly fixed from 0 to 25° from a side of the ski.

The bushing 43 fixed to the plate of translation 90 is mobile and concentric around the axle. The plate 90 being welded angularly to the bushing 43 thereby causing a vertical position to the wheel when riding against ground and a slanted position when resting above the ski.

A plate of steel 69 is fixed on the ski by bolts 73 and comprising a recess 75 corresponding to a like recess on the axle 55 and intended to prevent the axle from revolving.

The plate of steel 69 comprises an axle guard 59 pointed and being bent perpendicularly and intended to deviate stones and obstacles from axle 55, the axle guard acting in combination with a deflector 95 to deflect snow destined to cool radiators.

An additional device of wheels can be also added on the inside of a ski, in addition to the outside face. A system of concentric bushings allowing the elevation or the lowering of the wheels can be used. The system includes:

a first bushing 31 comprising an arm 49 intended to be moved mechanically or manually. The first bushing surrounds the male part 38 and comprises a first road 80 intended to receive a first ankle 82 perpendicularly placed on the male part. The first bushing also includes a second road 84 intended to receive a second ankle 86;

a second concentric bushing 33 surrounding the first bushing 31 and which includes the second ankle inwardly jutting out of the second bushing 33 and intended to cross the second road to grant an arc of raising or lowering of an arm of axle 65 of an internal wheel 68' of the ski 22. An abutment 78 is used to limit the rotation of the second bushing 33. The raises of the outside and internal wheels corresponding to the first and second roads 84 and 86 can be equal or not according to the diameters of the wheels. For example, if the internal wheel is smaller than the outside wheel, the second road 86 will be longer than the first road 84 because the small wheel will need more running to lean on the ground, or on the contrary thanks to the abutment 78. A hydraulic motor with pump is added to the snowmobile to push a hydraulic pressure in cylinders.

It is to be clearly understood that the instant description with reference to the annexed drawing is made in an indicative manner and that the preferred embodiments described herein are meant in no way to limit further embodiments realizable within the scope of the invention. The matter which is claimed as being inventive and new is limited only by the appended claims.

| PARTS | | | | | |
|---|---|---|---|---|---|
| 20 | Snowmobile | 22 | Skis | 22' | Back ski |
| 22" | Front ski | 22"' | Sides | 23 | Wear runner |
| 24 | Supporting stalk | 25 | Small dome | 25' | Bigger dome |
| 26 | Central pivot | 27 | Extension | 28 | Direction of movement |
| 30 | Sliding tube | 30' | Oblique tube | | |
| 31 | First bushing | 32 | Distance | 33 | Second bushing |
| 34 | Seasaw | 35' | Twist | 35 | Rigid twisted arm |
| 36 | Near extremity | 37 | Periphery | 38 | Male part |
| 39 | Weld | 40 | Triangular body | 41' | Remote tie |
| 41" | Near tie | 42 | Side end | 43 | Bushing |
| 44 | Curved junction | 45 | Trajectory | 46 | Top end |

-continued

PARTS

| 47 | Thread | | | | |
|---|---|---|---|---|---|
| 48 | Tip | 49 | Arm | 50 | Remote end |
| 51, 51' | Circumferences | 52 | Hub | 53 | Interior male part |
| 54 | Curved structure | 55 | Axle | 56 | Crowbar |
| 57 | Nut | 58 | Slice | 59 | Axle Guard |
| 60 | Openings | 62 | Spiralled channel | 64 | Twisted part |
| 65 | Arm of axle | 66 | Ball | 68 | Wheel |
| 68' | Internal wheel | 69 | Steel plate | 70 | Hole of the wheel |
| 72 | Cylinder | 73 | Bolt | 74 | Electric motor |
| 75 | Recess | 76 | Piston | 78 | Abutment |
| 79 | Cylinder pivot | 80 | First keyway | 82 | First ankle |
| 84 | Second keyway | 86 | Second ankle | 88 | Positioning angle |
| 89 | Small angle | 90 | Plate of translation | 94 | Pivot of the piston |
| 95 | Deflector | 96 | Spike | 97 | Spring |
| 98, 98' | Stoppers | | | | |

I claim:

1. (FIGS. 9C,10A,11A) In a snowmobile having two skis, each ski comprising rotation means transversally disposed about an axis (27,55) of said ski, a retractable wheel device disposed to effect contact with the ground when on an internal side of either ski, said device comprising:
a triangular body (90)(FIG. 11A) installed in a first plane and comprising a first extremity comprising a rotating part (43, FIG. 10A) comprising means of rotation disposed perpendicularly (51, FIG. 9A) (38, FIGS. 1 &7) of said first plane, said means of rotation comprising a rotative male-female part (43) moving around a male-female center axle (55);
said triangular body comprising a remote end (50) comprising a hub (52) substantially perpendicular to said first plane and intended to receive a wheel (68); said hub being connected with said rotating part by a rigid arm (90);
a third extremity of said triangular body comprising means to apply a rocking movement with regard to said first extremity for making it revolve, said third extremity being radially located with regard to a pivot center (55), thereby allowing the displacement of a circumferential push from 0 to 120°.

2. The device of claim 1 used in the direction of displacement of the snowmobile wherein said high position is located towards the back of a central pivot (26) of said ski, said means of rotation comprising means to lower said hub in a direction towards the front of said ski when said snowmobile arrives on earth road said wheel being lowered next to and under said ski, thereby raising said snowmobile ski upon said wheel touching the ground for better driving.

3. (FIG. 9A,9C) The device of claim 1 wherein said third extremity is remotely located (51') with regard to said first plane thus creating a second parallel plane to said first plane.

4. (FIG. 9A) The device of claim 1 wherein said means of rotation comprise means of tube and said means of tube comprise a near tie (41") and a remote tie (41') comprising means to allow the rotation around a circumference (51) of a male part (53).

5. (FIG. 9C) The device of claim 4 wherein said ties (41", 41') are continuous and form a female tie defining a sliding tube (30) as means of rotation and housing said male part (53 FIG. 9C).

6. The device of claim 4 wherein said remote tie is oriented from 1° to 45° with regard to said near tie (FIG. 9A).

7. (FIG. 9A) The device of claim 1 wherein said rigid arm comprises a first twist (35) for positioning said hub at an angle corresponding to an orientation of said male part, said positioning angle (88) comprised between 1 and 45°.

8. (FIG. 9A) The device of claim 7 wherein said rigid arm further comprises a second twist (35') added to said curve to minimize a spread with regard to said high structure, said twisted arm comprising an angle of twisting (35') from 2° to 15° to keep said wheel from interference during the sliding of said ski on the snow.

9. (FIG. 9B) The device of claim 7 comprising an arm (65) manually moved and retractable by means of a spring held by a pawl which is automatically removed when commanded by a driver.

10. (FIG. 11A) The device of claim 1 wherein said rocking movement is produced by a piston (76) on a pivot of piston (94), said piston activated by means of a motor connected to a control box controlled by a driver.

11. (FIG. 10A) The device of claim 1 wherein said ski comprises a supporting stalk (24) comprising a central pivot (26) and said means of rotation (43) is located near said support, from 0 to four inches towards the rear and oriented between said two skis.

12. The device of claim 11 wherein said central pivot (26) comprises an extension (27) holding an axle (55) surrounded by a rotation bushing (43) attached to a plate of translation (90).

13. (FIG. 10A) The device of claim 12 wherein said axle (55) is eccentric with respect to said extension (27).

14. The device of claim 12 wherein said plate of translation (90) comprises a deflector (95) and a spike (96) perpendicularly disposed and intended to scratch snow and ice to throw a mist of snow to cool a part of said snowmobile, said spike comprising means of spring (97) intended to limit between a first and a second stoppers (98, 98') and to return the movement of said spike.

15. The device of claim 14 wherein said spring is positioned around one of a group of elements comprising said hub (52), said central pivot (26) and being removable and being tidied up.

16. The device of claim 12 wherein said rotative bushing (43) is rotating around said axle (55), said axle being oriented from 0 to 25° from said central pivot (26) and intended to position said wheel in high position above said ski and displaced according to a left-right orientation of said wheel.

17. The device of claim 12 wherein said extension (27) is surrounded by said axle (55) angularly fixed from 0 to 25° from a side of the ski and said bushing (43) fixed to said plate of translation (90) is mobile and concentric around said axle, said plate (90) being welded angularly to said bushing (43) thereby causing a vertical position to said wheel when riding against ground and a slanted position when resting above said ski.

18. The device of claim 12 comprising a plate of steel (69) fixed on said ski by bolts (73) and comprising a recess (75) corresponding to a like recess on said axle (55) and intended to prevent said axle from revolving.

19. The device of claim 18 wherein said plate of steel (69) comprises an axle guard (59) pointed and being bent perpendicularly and intended to deviate stones and obstacles from axle (55), said axle guard acting in combination with a deflector (95) to deflect snow destined to cool radiators.

\* \* \* \* \*